(Model.)

L. H. EMMONS.
THILL COUPLING.

No. 280,806. Patented July 10, 1883.

WITNESSES
Jas. E. Hutchinson
W. E. Longley

INVENTOR
Lucius H. Emmons

UNITED STATES PATENT OFFICE.

LUCIUS H. EMMONS, OF NOBLESVILLE, INDIANA, ASSIGNOR OF ONE-HALF TO LUCIUS LYBRAND, OF SAME PLACE.

THILL-COUPLING.

SPECIFICATION forming part of Letters Patent No. 280,806, dated July 10, 1883.

Application filed May 10, 1883. (Model.)

*To all whom it may concern:*

Be it known that I, LUCIUS H. EMMONS, of Noblesville, Hamilton county, State of Indiana, have invented a new and useful Device for Attaching Thills to Buggies and other Vehicles; and I do hereby declare that the following is a full, clear, and exact description thereof, reference being had to the accompanying drawings, forming a part of this specification.

This invention relates to the mode of attaching thills to buggies and other vehicles, whereby they are more readily attached and detached, and dispenses entirely with the necessity of threads and taps.

To enable skilled artisans to make and use my invention, it is more fully described hereinafter.

My invention consists in furnishing the metal clip with slots and arranging a pin provided with a key in relation thereto, so that the thills can be attached to the axle without the use of threads and taps.

Figure 1:
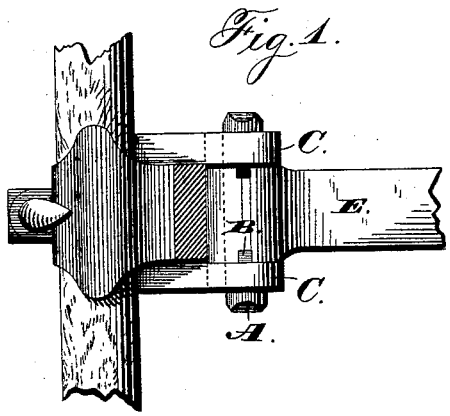
Figure 4:
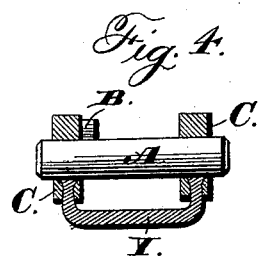
Figure 2:
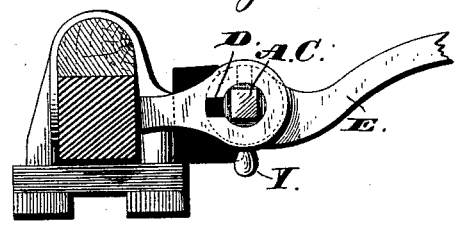
Figure 5:
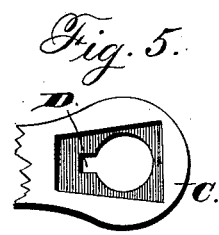
Figure 3:
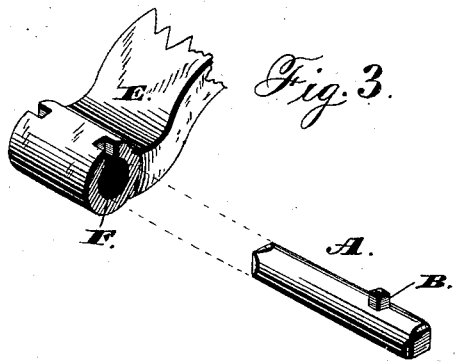

Figure 1 is a view of my invention with the coupling made. Fig. 2 is an end view of the same, showing the slot in the clip. Fig. 3 is the eccentric thill-bar or shaft-iron, also the pin provided with a key. Figs. 4 and 5 are detail views.

Similar letters of reference indicate the same parts in the several figures.

C is the metal clip, provided with the slots D D, through which the pin A, provided with the key B, passes. The thill-bar or shaft-iron E is also provided with key-seats F F, into which the key B buries itself after passing through the slot D in the clip. On the under side of the clip C is a brace, Y, to prevent the spreading of the clip, as shown in Fig. 4 of the drawings. By this form and arrangement of the clip C, with its slots D D, and the pin A, provided with the key B, the thill-bar or shaft-iron E, with its key-seats F F, I am enabled to hold the thill or shaft in position securely without the necessity or aid of threads and taps. The clip may be furnished, when desired, with a brass bushing, as shown in Fig. 5 of the drawings; also, the pin and key may be made of brass when desired.

Another and very desirable feature of my device is, that the thill-bar or shaft-iron is made eccentric, so that when the thills are raised the pin is easily inserted, and the strain is lessened on the rubber or spring anti-rattlers, either of which can be used.

Having thus fully described my invention, what I claim as new and original, and desire to secure by Letters Patent, is—

The clip C, furnished with slots D D and brace Y, the eccentric thill-bar or shaft-iron E, provided with key-seats F F, in combination with the pin A, with its key B, substantially as and for the purpose set forth.

Noblesville, Indiana, April 30, 1883.

LUCIUS H. EMMONS.

Witnesses:
 THOS. J. MYERS,
 H. E. BARNES.